United States Patent [19]

Powell et al.

[11] Patent Number: 6,085,663

[45] Date of Patent: *Jul. 11, 2000

[54] SYSTEM AND METHOD FOR MAGNETIC LEVITATION GUIDEWAY EMPLACEMENT ON CONVENTIONAL RAILROAD LINE INSTALLATIONS

[76] Inventors: James R. Powell, P.O. Box 547, Shoreham, N.Y. 11786; Gordon T. Danby, P.O. Box 12, Wading River, N.Y. 11792

[*] Notice: This patent is subject to a terminal disclaimer.

[21] Appl. No.: 09/358,279

[22] Filed: Jul. 21, 1999

Related U.S. Application Data

[63] Continuation of application No. 09/055,079, Apr. 3, 1998, Pat. No. 5,953,996.

[51] Int. Cl.$^7$ ...................................................... B60L 13/00
[52] U.S. Cl. .............................. 104/281; 104/292; 238/27
[58] Field of Search ...................................... 104/281, 282, 104/283, 284, 286, 290, 292; 238/27

[56] References Cited

U.S. PATENT DOCUMENTS

| | | |
|---|---|---|
| 3,233,559 | 2/1966 | Smith et al. . |
| 3,470,828 | 10/1969 | Powell, Jr. et al. . |
| 3,783,794 | 1/1974 | Gopfert et al. . |
| 3,820,471 | 6/1974 | Maki et al. . |
| 3,834,318 | 9/1974 | Fellows et al. . |
| 3,845,720 | 11/1974 | Bohn et al. . |
| 3,934,183 | 1/1976 | Saufferer ................................ 104/292 |
| 4,092,554 | 5/1978 | Quinn . |
| 4,123,976 | 11/1978 | Nakamura et al. . |
| 4,259,908 | 4/1981 | Feistkorn et al. . |
| 4,280,412 | 7/1981 | Mihirogi . |
| 4,516,505 | 5/1985 | Heidelberg . |
| 4,641,586 | 2/1987 | Miller et al. . |
| 4,646,651 | 3/1987 | Yamamura et al. . |
| 4,665,830 | 5/1987 | Anderson et al. . |
| 4,731,569 | 3/1988 | Bohn . |
| 4,866,380 | 9/1989 | Meins et al. . |
| 4,870,906 | 10/1989 | Schaffer et al. . |
| 4,913,059 | 4/1990 | Fujie et al. . |
| 4,972,779 | 11/1990 | Morishita et al. . |
| 5,027,713 | 7/1991 | Kindmann et al. . |
| 5,052,309 | 10/1991 | Haselwander et al. . |
| 5,067,415 | 11/1991 | Morishita et al. . |

(List continued on next page.)

FOREIGN PATENT DOCUMENTS

| | | |
|---|---|---|
| 2654731 | 4/1978 | Germany . |
| 39 14093 | 10/1990 | Germany . |
| 43 13846 | 11/1993 | Germany . |
| 11420 | 1/1978 | Japan . |
| 17208 | 8/1979 | Japan . |
| 151204 | 11/1979 | Japan . |
| 107603 | 4/1989 | Japan . |
| 37070 | 2/1990 | Japan . |
| 220964 | 9/1990 | Japan . |

OTHER PUBLICATIONS

Thomas D. Rossing and John R. Hull, "Magnetic Levitation", The Physics Teacher, Dec. 1991, pp. 552–562.
Copy Of The International Search Report Relating To PCT/US99/06718 Dated Jul. 9, 1999.

*Primary Examiner*—Mark T. Le
*Attorney, Agent, or Firm*—Fulwider Patton Lee & Utecht, LLP

[57] ABSTRACT

The maglev guideway is to be constructed on railroad ties of existing rail lines so that the rail lines can be used by both maglev vehicles and conventional trains. A plurality of support bars are mounted on the rail ties, and a plurality of guideway panels mounted on the support bars. Each of the guideway panels has vertical lift and stability windings for providing vertical lift, pitch and roll stability to the maglev vehicle, and preferably also has lateral stability windings and linear synchronous motor windings. A protective cover sheet can be installed on the guideway panel, and the support bars can be pre-assembled by mounting them onto a registration grid. The guideway panel can also have a plurality of slots for accommodating threaded fasteners for mounting the guideway panel to the support bars.

36 Claims, 10 Drawing Sheets

U.S. PATENT DOCUMENTS

| | | |
|---|---|---|
| 5,094,173 | 3/1992 | Tada et al. . |
| 5,146,853 | 9/1992 | Suppes . |
| 5,156,092 | 10/1992 | Hirtz . |
| 5,178,072 | 1/1993 | Suzuki . |
| 5,184,557 | 2/1993 | Rossing . |
| 5,213,046 | 5/1993 | Proise ........................................ 104/281 |
| 5,253,592 | 10/1993 | Coffey ..................................... 104/281 |
| 5,270,593 | 12/1993 | Levi et al. .............................. 104/292 |
| 5,314,115 | 5/1994 | Moucessian . |
| 5,503,083 | 4/1996 | Powell et al. . |
| 5,953,996 | 9/1999 | Powell et al. ........................... 104/281 |

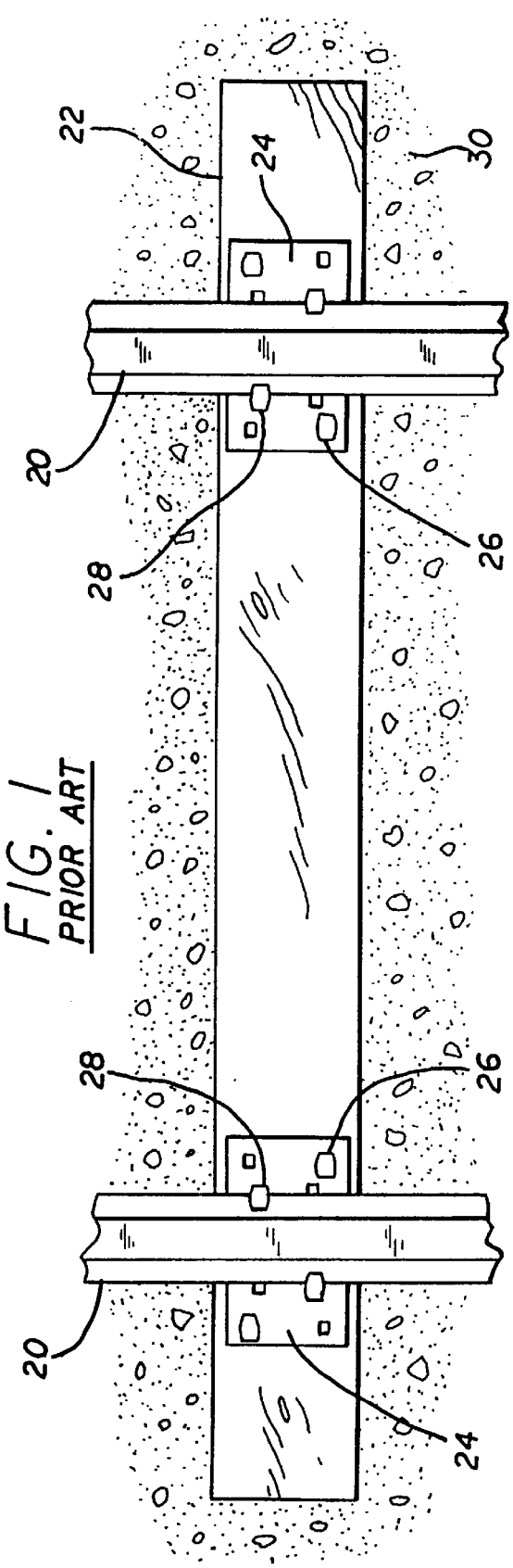
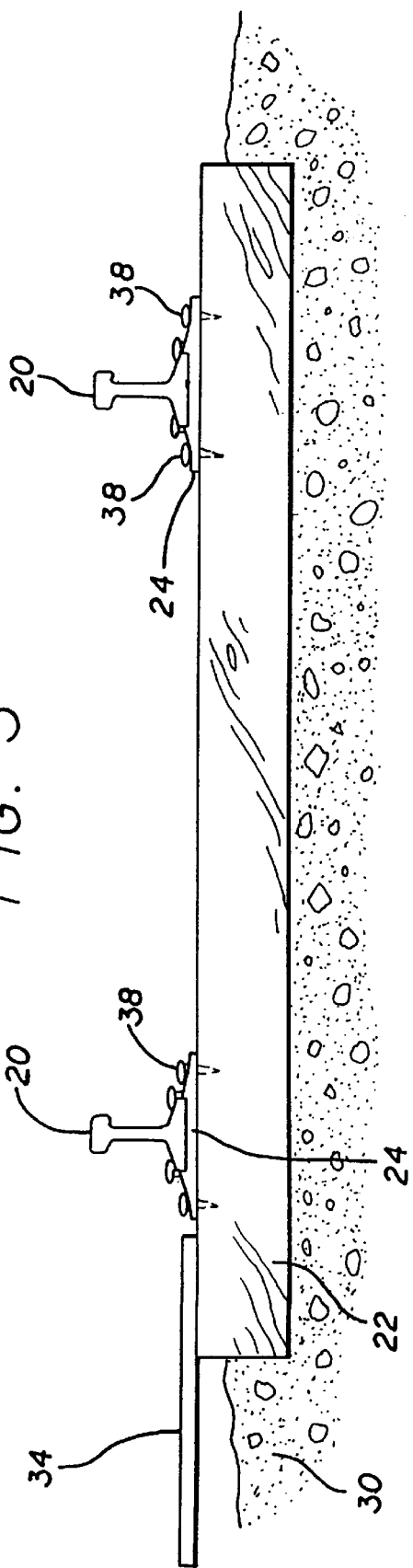

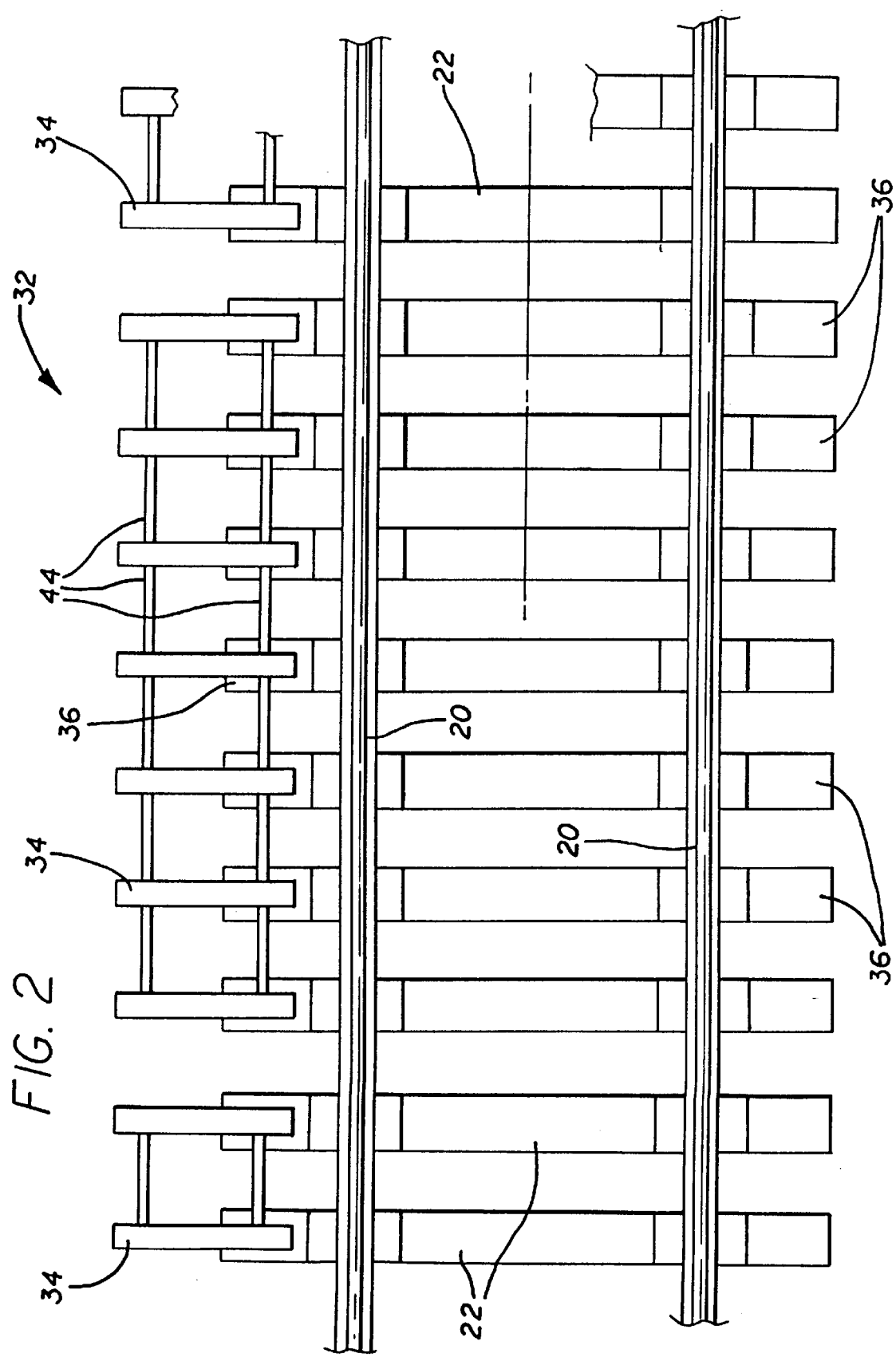

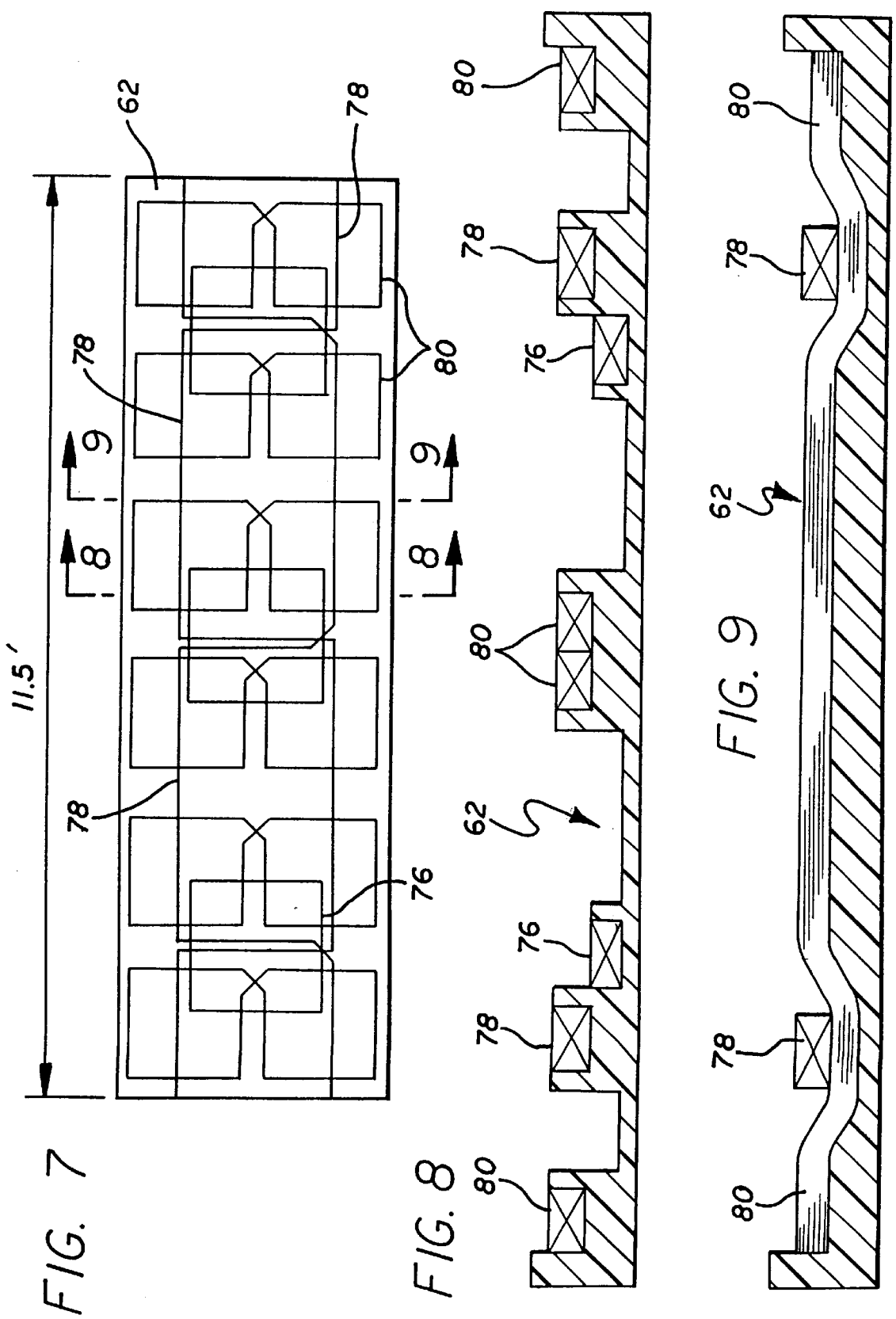

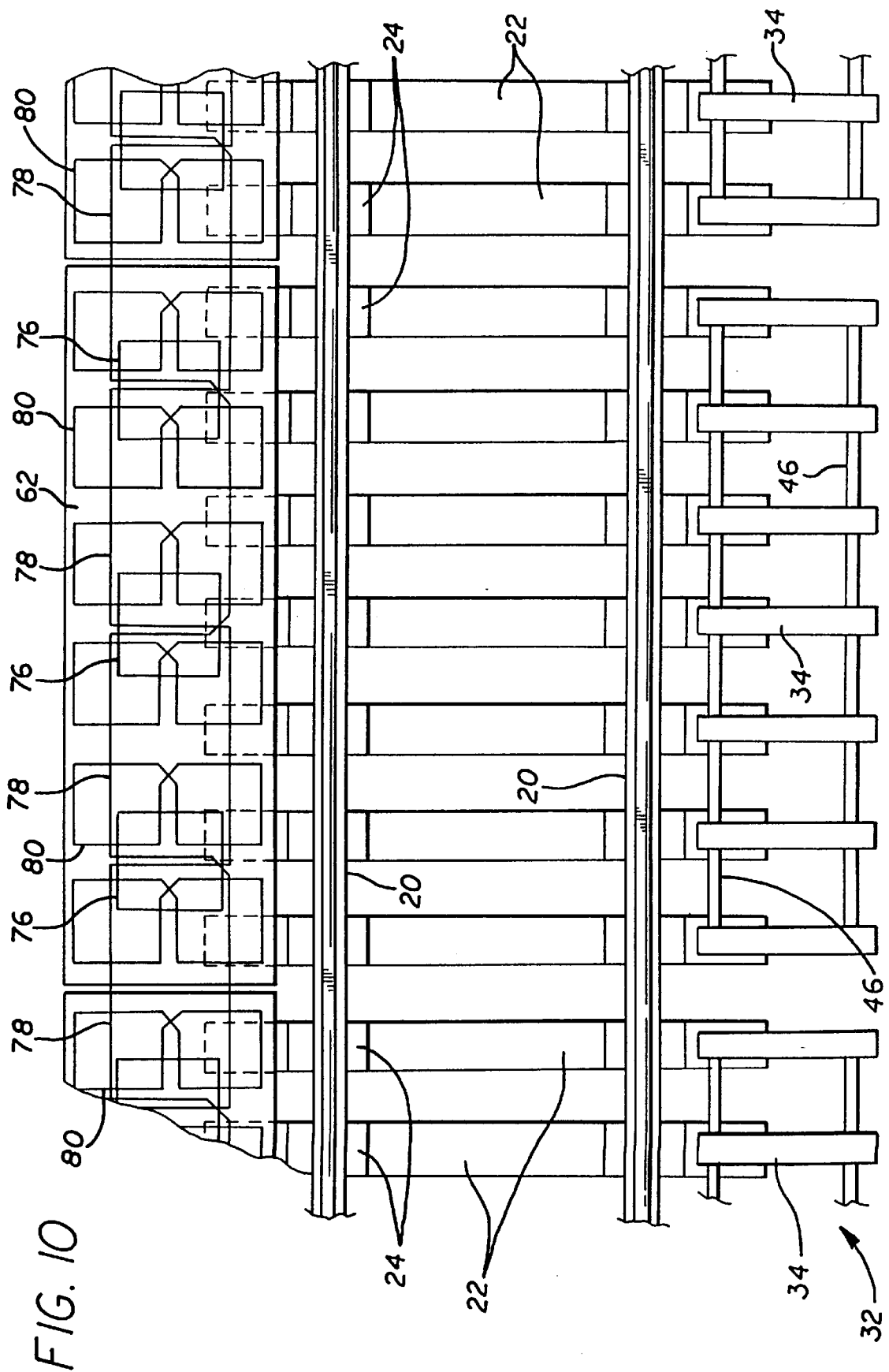

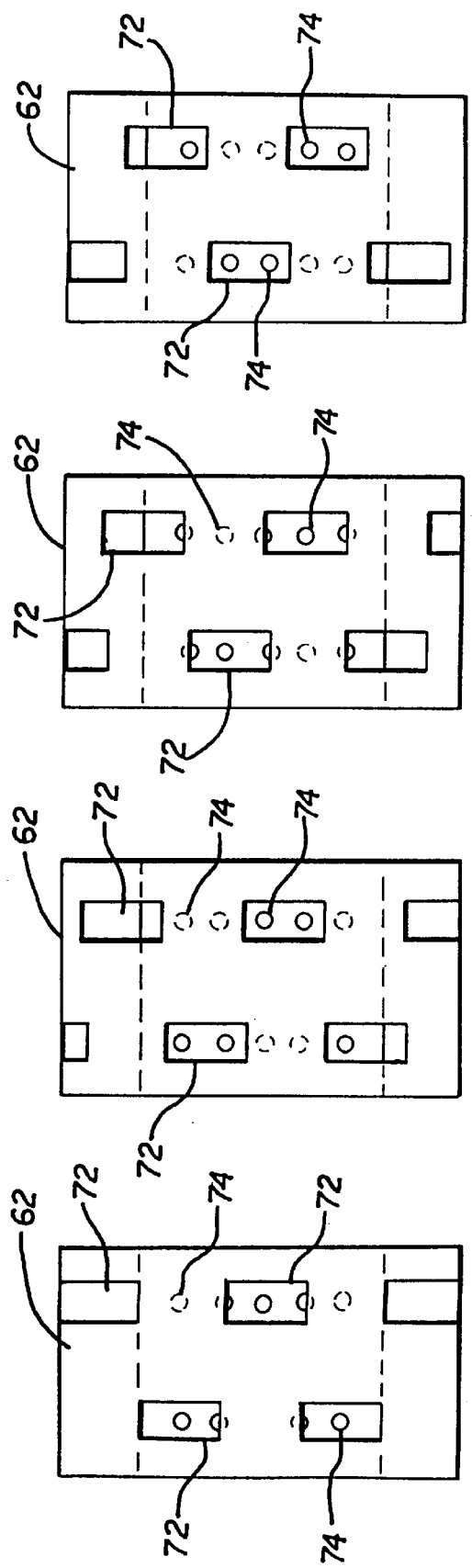
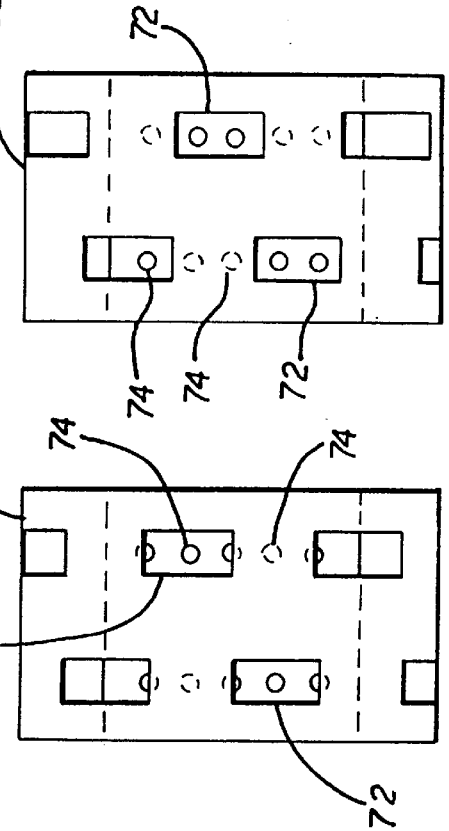
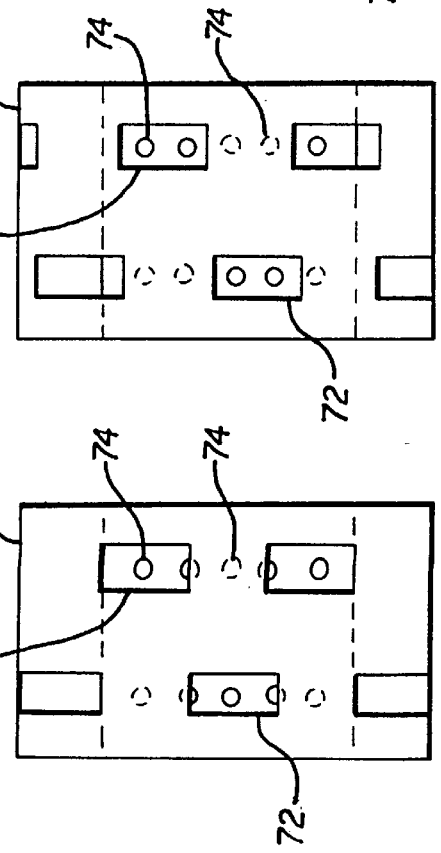

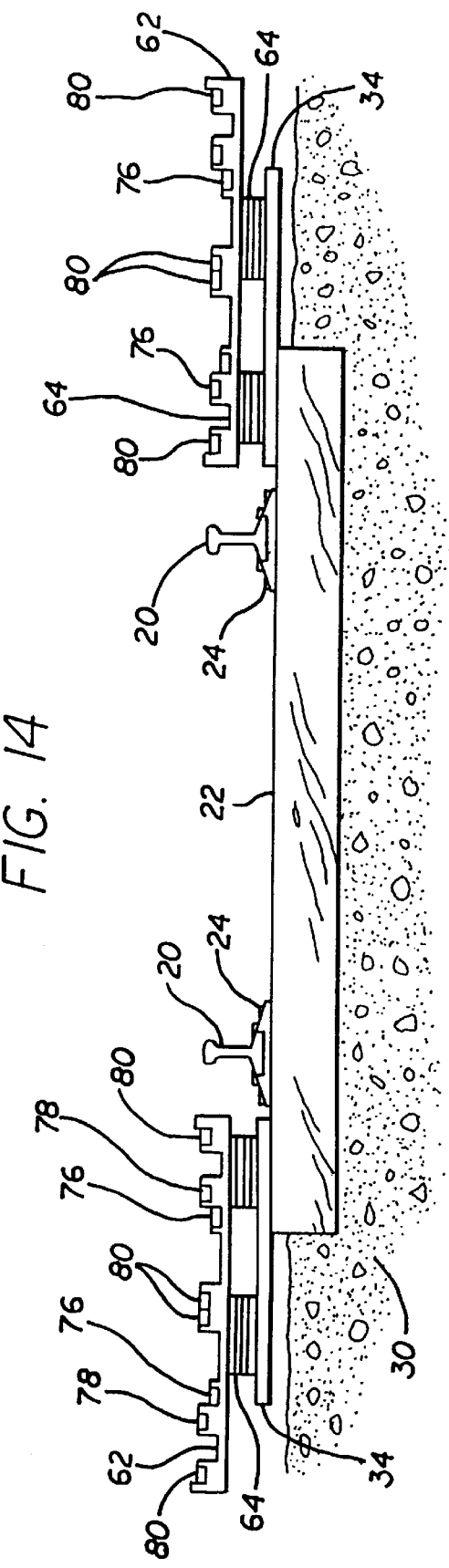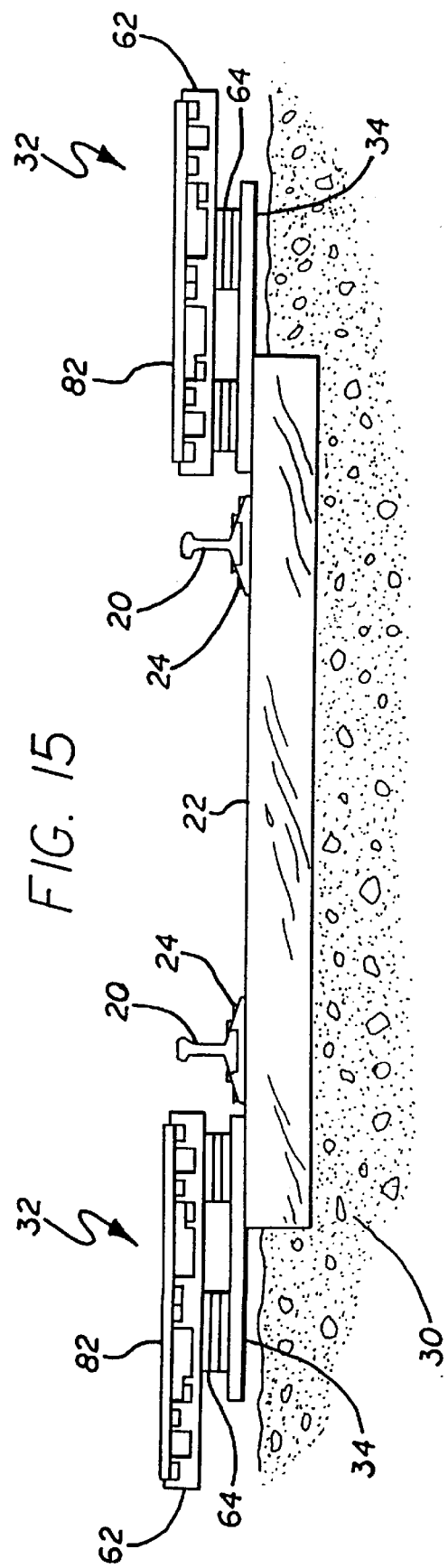

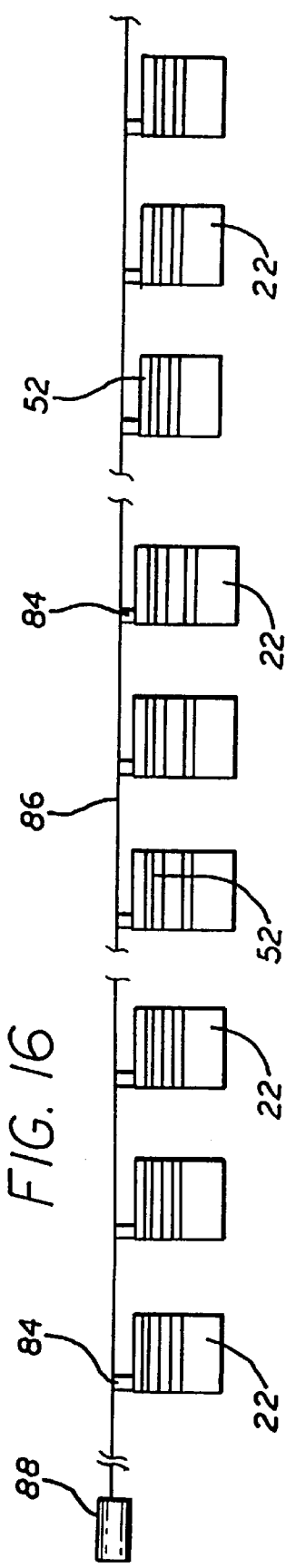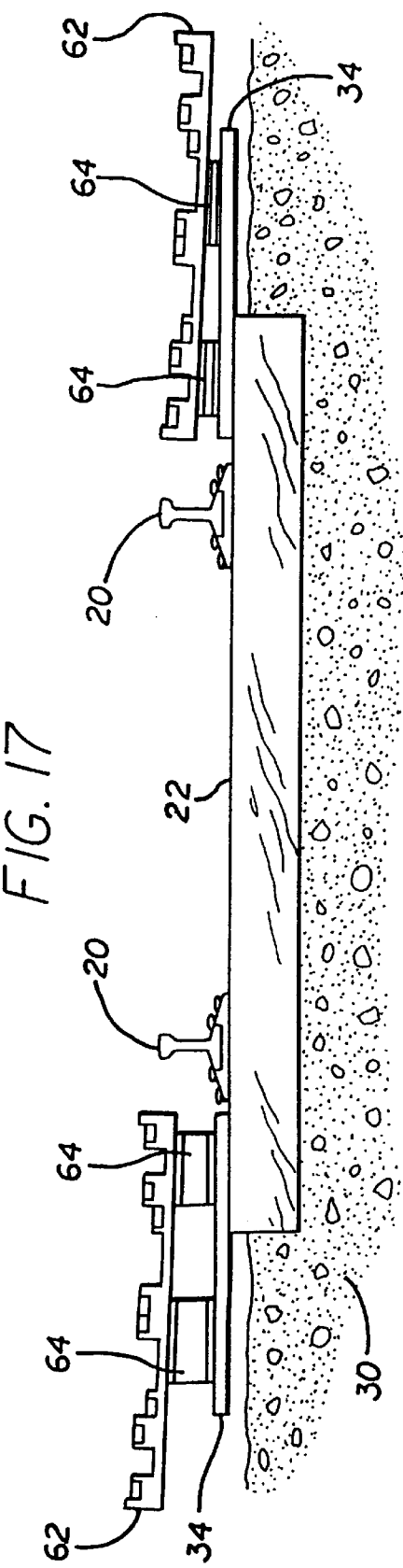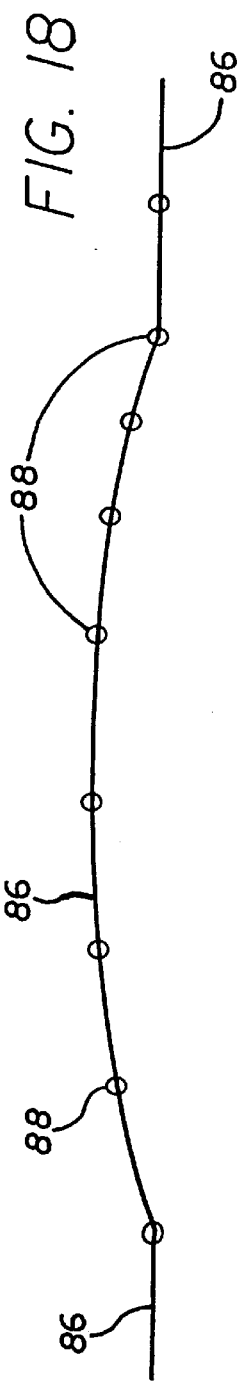

SYSTEM AND METHOD FOR MAGNETIC LEVITATION GUIDEWAY EMPLACEMENT ON CONVENTIONAL RAILROAD LINE INSTALLATIONS

RELATED APPLICATIONS

This is a continuation of Ser. No. 09/055,079 filed Apr. 3, 1998, now U.S. Pat. No. 5,953,996.

BACKGROUND OF THE INVENTION

1. Field of the Invention

This invention relates generally to a guideway and levitation system for transport vehicles, and more particularly concerns a system for maglev track/guideway emplacement on existing rail lines that can be used by both maglev vehicles and conventional trains. The emplacement is compatible with, and can be used by, maglev vehicles that can also travel on high speed dedicated guideways.

2. Description of Related Art

Interest in passenger and freight ground vehicles levitated by magnetic forces has grown with new advances in materials and technology, and as needs have increased for transportation systems that can minimize environmental and noise pollution, that are more energy efficient, and that can reduce the traffic congestion and improve travel safety. Magnetic levitation transportation systems have been proven in pilot projects to be able to achieve speeds of 300 miles per hour and faster.

Vehicles that are levitated magnetically without contacting a support surface encounter reduced friction and vibration problems due to roadbed irregularities. An early system provided for a train levitation system based on the magnetic repulsion generated between two superconducting loops carrying D.C. current, one on a moving train and one on a stationary track. In a subsequent system, the superconducting magnets interacted with a plurality of arrays of longitudinally extending shorted loops of a non-magnetic metal conductor, such as aluminum, in a guideway. The vehicle was suspended over the guideway by magnetic interaction of the superconducting magnets with the shorted loops in the guideway. The vehicle was supported on wheels when at rest, or when it was started, or operated at transitional speeds below that necessary to suspend the vehicle. Vertical lift was provided by magnetic interaction of the superconducting magnets with coils in the form of individual shorted loops. Horizontal stability was provided by magnetic interaction of the superconducting magnets with coils arranged in a FIG. 8 shape or in the form of a longitudinally extending series of two vertically spaced, electrically separated loops. The superconducting magnets were accommodated in a coolant container of a car of the train, and auxiliary and emergency support devices, such as wheels and a fixed skid, were provided support in the event that the levitation of the train was terminated in use, such as if the superconducting magnets became normal. The train was propelled by a linear synchronous motor, in which thrust was obtained by providing AC current to propulsion windings on the ground, which magnetically interacted with, and pushed forward the superconducting magnets located on the car of the train.

Previous studies of maglev guideways have typically focused on designing and building dedicated structures that can only carry maglev vehicles, whether for passengers or freight. These guideways are usually elevated structures that can be constructed in the field, or prefabricated and assembled from factory produced components such as beams and piers, with poured footings.

On many sections of railroad track in the United States, train speed is considerably less now than it was decades ago, due to deterioration of the road bed. The current costs of building new access ground transport routes to urban areas is extremely high, typically hundreds of millions of dollars per mile, and is normally much greater than building new routes in rural areas. In addition, the time required for obtaining new access areas for transportation routes in urban areas can be a very long, and expensive process.

In order to reduce costs of implementation and reduce the need for obtaining additional rights of way for high speed transportation routes, it would be desirable to provide a maglev guideway emplacement on existing rail lines that can be used by both maglev vehicles and conventional trains. This would enable maglev vehicles to travel at very high speed on dedicated guideways in low cost locations, i.e. rural and low population suburban areas, and transfer to existing railroad routes in high cost urban and high population suburban areas. Even with lower speed operation on such sections applied on existing rails, the average speed of maglev vehicles can be expected to remain almost as great as for a maglev route using only dedicated guideways. It would also be desirable to improve transportation capacity, and the ability to operate with closer headways, the distances in time or space that separate two vehicles or sets of vehicles traveling the same route.

It would also be desirable to provide a transportation that can be installed relatively quickly, without interfering with ongoing railroad operations, in virtually all of the United States, and particularly in population centers. It would also be desirable to provide a maglev track/rail transportation system that produces lower pressures on the ties and the ballast than is typically encountered with conventional trains. To reduce damage and degradation of the track and to minimize alteration of the position of the guideway emplacement. The present invention meets these needs.

SUMMARY OF THE INVENTION

Briefly, and in general terms, the present invention provides for a maglev guideway emplacement on existing rail lines that can be used by both maglev vehicles and conventional trains, to improve transportation capacity and reduce headways between trains. The system can be installed relatively quickly, and at relatively low expense, and reduces wear an misalignment of the existing rail lines due reduced pressures on ties and ballast.

The invention accordingly provides for an electromagnetic induction suspension and stabilization guideway for emplacement on ties of an existing rail line, for a vehicle having a plurality of superconducting magnets. The guideway generally comprises a plurality of support bars mounted on the rail ties, and a plurality of guideway panels mounted on the support bars, each of the guideway panels having vertical lift and stability means for providing vertical lift, pitch and roll stability to the vehicle. In a currently preferred embodiment, the support bars can be pre-assembled by mounting the support bars onto a registration grid which keeps them properly positioned relative to each other and to the railroad ties. In a presently preferred embodiment, each of the guideway panels also has lateral stability means for providing lateral stabilization and centering of the vehicle with respect to said guideway. In another currently preferred embodiment, each of the guideway panels also has linear synchronous motor means for providing linear propulsion to the vehicle. In another presently preferred embodiment, a protective cover sheet can also be installed on the guideway panel to keep out dirt, rain, snow, and the like.

The guideway system can include multiple compliant layers that can be made of elastomeric or rubber material, such as on the bottom of a support bar where it contacts a railroad tie, in shims between the support bar and guideway panel, and in compliant washers that may be used under fasteners holding the support bars to the ties, and under fasteners holding the panels to the support bars, for example. These layers of compliant material take up the local stresses and movements caused by passage of the conventional railroad trains and maglev vehicles. The guideway panel can also have a plurality of slots for accommodating threaded fasteners for mounting the guideway panel to the support bars, and in one presently preferred embodiment, two rows of spaced, alternating slots are provided in the guideway panel.

The maglev track/guideway emplacement on existing rail lines can be used by both maglev vehicles and conventional trains. Since maglev vehicles generally do not contact the track structure, they are able to travel at considerably higher speeds than conventional trains, with the major limitations on the speed of the maglev vehicles being presented by curves and safety requirements for reduced speed at crossings. In addition, the vertical and lateral loads of a maglev vehicle are typically transferred to the railroad the tie and rail structure as a smooth, distributed loading.

A typical implementation of the track/guideway structure would be in conjunction with a high speed guideway allowing speeds of up to 300 mph, for example. Typically a portion such as 10 to 20 miles of the maglev route, for example, could be applied on an existing railroad track, even through densely populated areas. Even with lower speed operation on such sections applied on existing rails, the average speed can be expected to remain almost as great as for a maglev route that utilized only a dedicated guideway. The dual use system eliminates the need for constructing a separate, very expensive and politically difficult new guideway through densely populated areas.

In another implementation, the track/guideway structure can be integrated with existing rails over an entire intercity route to provide a maglev route. In general, the average speed of maglev vehicles on such a route can be expected to be considerably less than 300 mph, due to curve limitations at some locations and grade crossings. Without modifications of an existing route, the average speed of such a line can be expected to be perhaps as much as 150 to 200 mph.

In another implementation, the track/guideway structure can be integrated with existing suburban feeder and connector rail lines, such as to airports, for example. In general, the average speed of maglev vehicles on such a route can be expected to be in the range of 100 to 150 mph, which would still be 2 to 3 times greater than is typically achieved by conventional trains.

Maglev vehicles on a maglev guideway installed on existing rail lines can operate at considerably higher speeds than ordinary trains, since they are not constrained by rail distortions or misalignments. Maglev vehicles are not constrained by small misalignments on the road bed, since they operate with large clearances so that the maglev vehicles do not contact the supporting tracks. Speed constraints of maglev vehicles on a maglev guideway installation on existing rail lines will generally be determined by curves, which are typically very gentle, and grade crossings. For main line routes, the maximum degree of curvature is typically in the range of 6 to 8 degrees, corresponding to a radius of curvature of approximately 300 meters. Increased speed will consequently improve capacity. However, even more important is the ability of maglev vehicles to operate with closer headways, which are the distances in time or space that separates two vehicles or sets of vehicles traveling the same route. For example, a two-way maglev system utilizing maglev track/guideway emplacement on rail lines could easily carry over 100,000 passengers and thousands of freight vehicles per day. The Linear Synchronous Motor (LSM) propulsion nature of maglev vehicles inherently ensures that the separated vehicles or sets of vehicles can automatically maintain their spacing, because all vehicles or sets of vehicles move at the same speed, regardless of variations in drag force or grades. This feature enables much closer headways.

The non-contacting, large clearance nature of maglev vehicles also eliminates the jarring impulses of conventional trains caused by steel wheels riding on steel rails. Any small residual variations in levitation and stability forces can easily be counteracted using a simple secondary suspension or other similar means, resulting in a much smoother ride than is possible with conventional trains.

Using prefabricated guideway sheets, a maglev track/guideway emplacement on rail lines could be installed in a few weeks, without interfering with ongoing railroad operations. The vertical and lateral positions of the dual track/guideway panels can be quickly adjusted during installation to accommodate variations in the elevation, lateral position, slope, and spacing of the railroad ties, so as to provide a high quality, non-bumpy guideway. Since virtually all railroad tracks have a low duty cycle, i.e., the percentage of time that a railroad train is actually on a particular section of track is very small, and the period of time between trains is typically very long, it should be possible to install a maglev track/guideway according to the present invention on existing rail lines without interfering with normal traffic. In addition, in view of the great extent of existing rail lines in the United States, a maglev system utilizing maglev track/guideway emplacement on rail lines could reach virtually all of the United States population and all of the population centers.

The guideway panels of the system can be quickly and securely attached to the existing railroad ties. Because a new roadbed does not have to be built, and because the prefabricated guideway sheets can be manufactured and installed at low cost, the cost of a maglev track/guideway emplacement on rail lines can be relatively low. Preliminary estimates indicate that a two-way maglev system utilizing maglev track/guideway emplacement on rail lines can currently be installed for about one to two million dollars per mile, compared to an anticipated cost of ten to twenty million dollars per mile for a conventional high speed rail or maglev system.

The maglev track/guideway system installed on existing rail lines according to the invention results in much lower pressures on the ties and the ballast than is typically encountered with conventional trains. The maglev track/guideway system of the invention also results in much lower stresses on the rails, so that continued passage of conventional railroad trains over the dual railroad maglev track/guideway does not damage, degrade or alter the position of the maglev guideway.

These and other aspects and advantages of the invention will become apparent from the following detailed description and the accompanying drawings, which illustrate by way of example the features of the invention.

BRIEF DESCRIPTION OF THE DRAWINGS

FIG. 1 is an enlarged top plan view of a rail tie and short section of a prior art rail line;

FIG. 2 is a top plan view of a section of an existing rail line with support bars installed on one side of the rail ties according to the principles of the invention;

FIG. 3 is a cross-sectional view of an existing rail line with support bars installed on one side of the rail ties such as in FIG. 2 according to the principles of the invention;

FIG. 7 is a top plan schematic view of vertical lift/stability loop, LSM winding, and FIG. 8 lateral stability loops mounted on a guideway panel of the electromagnetic induction suspension and stabilization guideway of the invention;

FIG. 8 is cross-sectional view of the guideway panel taken along line 8—8 of FIG. 7;

FIG. 9 is cross-sectional view of the guideway panel taken along line 9—9 of FIG. 7;

FIG. 10 is a top plan view of a portion of an existing rail line with guideway panels and support bars installed on one side of the rail ties and support bars installed on the opposite side of the rail ties according to the principles of the invention;

FIG. 13A is a top plan view of a larger section of a guideway panel mounted to a support bar as shown in FIG. 12, showing an arrangement of slots in a portion of a guideway panel with respect to the holes for fasteners in an underlying support bar;

FIG. 13B is a top plan view of a larger section of a guideway panel mounted to a support bar as shown in FIG. 12, showing an alternative arrangement of slots in a portion of a guideway panel with respect to the holes for fasteners in an underlying support bar;

FIG. 13C is a top plan view of a larger section of a guideway panel mounted to a support bar as shown in FIG. 12, showing another alternative arrangement of slots in a portion of a guideway panel with respect to the holes for fasteners in an underlying support bar;

FIG. 13D is a top plan view of a larger section of a guideway panel mounted to a support bar as shown in FIG. 12, showing another alternative arrangement of slots in a portion of a guideway panel with respect to the holes for fasteners in an underlying support bar;

FIG. 13E is a top plan view of a larger section of a guideway panel mounted to a support bar as shown in FIG. 12, showing another alternative arrangement of slots in a portion ox a guideway panel with respect to the holes for fasteners in an underlying support bar;

FIG. 13F is a top plan view of a larger section of a guideway panel mounted to a support bar as shown in FIG. 12, showing another alternative arrangement of slots in a portion of a guideway panel with respect to the holes for fasteners in an underlying support bar;

FIG. 13G is a top plan view of a larger section of a guideway panel mounted to a support bar as shown in FIG. 12, showing another alternative arrangement of slots in a portion of a guideway panel with respect to the holes for fasteners in an underlying support bar;

FIG. 13H is a top plan view of a larger section of a guideway panel mounted to a support bar as shown in FIG. 12, showing another alternative arrangement of slots in a portion of a guideway panel with respect to the holes for fasteners in an underlying support bar;

FIG. 14 is a cross-sectional view of an existing rail line similar to that of FIG. 3 showing guideway panels mounted on support bars installed on both sides of the rail ties of an existing rail line according to the principles of the invention;

FIG. 15 is a cross-sectional view of an existing rail line similar to that of FIG. 14 additionally showing a cover sheet mounted over the guideway panels according to the principles of the invention;

FIG. 16 is an elevational view of support bars mounted on rail ties with shims for alignment of the support bars with a laser according to the principles of the invention;

FIG. 17 is a cross-sectional view of an existing rail line similar to that of FIG. 14 showing the use of shims to provide a desired degree of tilt the guideway panels;

FIG. 18 is a schematic diagram illustrating the laser alignment method of the invention for accommodating gentle curves of the track and guideway by making a series of straight line segment approximations along the track;

DETAILED DESCRIPTION OF THE PREFERRED EMBODIMENTS

Figure 6:
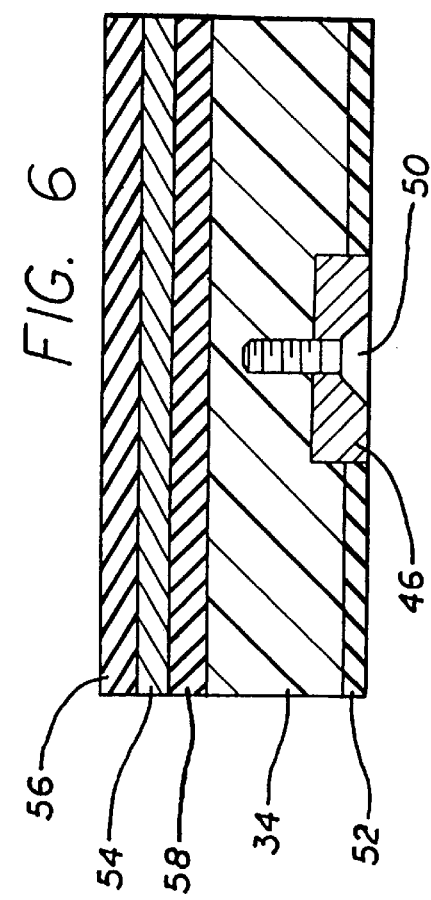
FIG. 6 is a sectional elevational view of a support bar mounted on registration grid stringers and installed on a side of the rail ties as in FIG. 5 according to the principles of the invention.

Previous maglev guideways have typically been highly specialized, being designed to carry only maglev vehicles. However, building such new specialized maglev transport routes can be extremely expensive, time consuming process. While conventional railroad track is relatively abundant, conventional train speeds are considerably less now than they were decades ago.

The invention accordingly provides for an improved maglev track/rail transportation system by constructing a maglev guideway on existing rail lines, so that they can be used by both maglev vehicles and conventional trains.

As is illustrated in the drawings, the invention is embodied in an electromagnetic induction suspension and stabilization guideway assembly for emplacement on ties of an existing rail line, for a maglev type vehicle having a plurality of superconducting magnets. Referring to FIG. 1, a conventional railroad line typically is constructed with a pair of rails 20 each mounted on a series of parallel rail ties 22 by tie plates 24. The tie plates are typically mounted to a rail tie by tie-plate hold-down spikes 26, and the rails are mounted to the tie plates by rail line spikes 28 driven into the rail ties. The rail ties a typically formed of treated wood, and are seated on a layer or layers of ballast 30 on a road bed.

Figure 4:
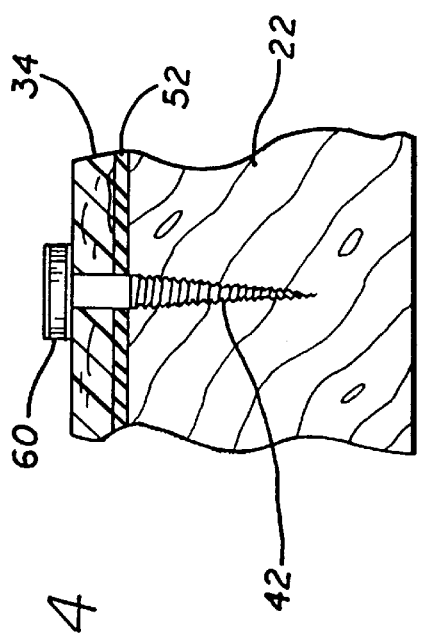
FIG. 4 is an enlarged sectional view of the mounting of a support bar to a rail tie with a fastener according to the principles of the invention.

With reference to FIGS. 2 to 15, the guideway assembly 32 includes a plurality of support bars 34 that are typically formed of polyester-fiberglass, mounted on the outer ends 36 of rail ties outside the tie plates for the rails of an existing rail line. While in ordinary railroad track, tie plates are attached to a tie by driving in four spikes, in a currently preferred embodiment of the guideway of the invention, screws 38 are used to attach the tie plates to a tie, especially since they can easily be removed if desired. Two screws are sufficient, but additional screws may also be used if desired. The tie plates can alternatively, or in addition, be secured to the ties by spikes, clamps, adhesive such as epoxy or the like, or similar fastening means. Each support bar preferably has a plurality of holes 40 for receiving fasteners 42 such as screws as shown in FIG. 4, for mounting the support bars to the ties, although other similar fasteners such as bolts, nails or spikes may also be suitable.

Figure 5:
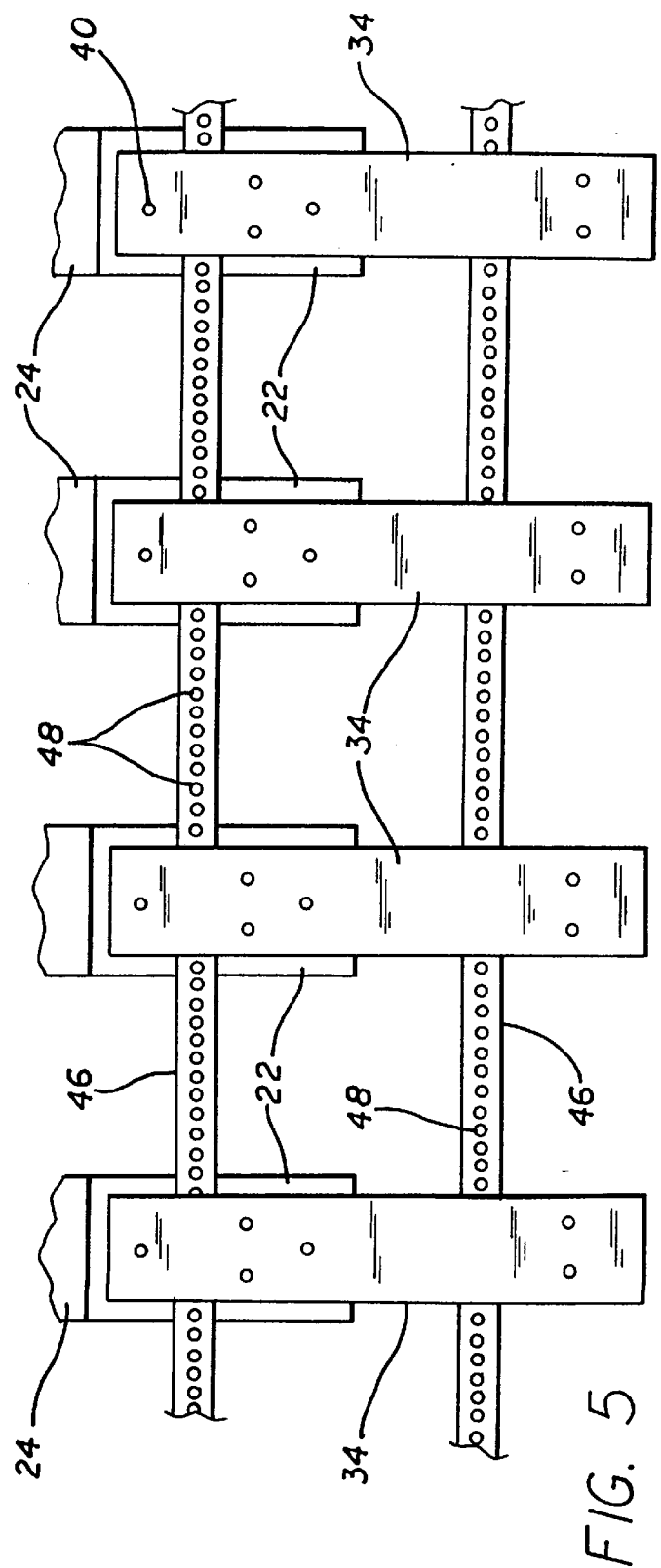
FIG. 5 is a top plan view of a portion of an existing rail line with support bars mounted on registration grid stringers and installed on a side of the rail ties according to the principles of the invention.

Referring to FIGS. 2, 3 and 5, in one presently preferred embodiment, instead of individually attaching the support bars to the ties, the support bars are installed by pre-assembling them in groups of several support bars onto a registration grid 44 typically formed of a pair of registration grid stringers 46 having a series of holes 48 for fasteners 50 for mounting the support bars to the registration grid stringers. The fasteners 50 are preferably threaded screws, although other similar fasteners such as bolts, nails or spikes may also be suitable. The registration grid keeps the support bars properly positioned relative to each other and to the railroad ties. The assembled grid and its attached support bars are then laid down on the railroad ties, and the bars fastened to the ties. This method of installation simplifies the installation of the support bars, allowing it to be done more quickly and inexpensively.

As is shown in FIG. 6, the guideway system includes multiple compliant layers that can be made of elastomeric or rubber material, for example. One compliant layer 52 is preferably disposed on the bottom of the support bar where it contacts the railroad tie. One or more shims 54 are also preferably placed on top of the support bars for adjusting the leveling and tilt of the guideway panels to be mounted on the support bars. The shims are typically formed of polyester-fiberglass. There are also preferably at least two compliant layers on the shims, with one compliant layer 56 on top of the shim, and another compliant layer 58 on the bottom of each shim, so that there would be three or four layers of compliant material if two shims are used. As shown in FIG. 4, compliant washers 60 are also used under the screws that hold the support bars to the ties.

The layers of compliant material take up the local stresses and movements caused by passage of the conventional railroad trains and maglev vehicles. The stresses and displacements caused by conventional trains will be much greater than that of the maglev vehicles by a factor of ten or more, since the maglev loadings are low in magnitude and distributed uniformly along the track compared to the loadings for conventional trains, in which the train loadings are much greater and concentrated at the wheels.

The maximum downwards deflection of the rail in a conventional railroad track is directly under the wheel load, and is given by the expression:

$$Y_0 = P(64EIU^3)^{-1/4}$$

where P=wheel load (lbs.); E=Young's modulus of steel ($3 \times 10^7$ psi); I=the moment of inertia of the rail (in.$^4$); U=the modulus of elasticity of the road bed; and $Y_0$=the rail downwards deflection (lbs./in.). The moment of inertia of 140 pound per yard rail is typically 97 in.$^4$. For a maximum wheel load of 30,000 pounds (for a locomotive wheel) and a good quality road bed with U equal to 3000 pounds per inch, $$Y_0 = 30{,}000(64 \times 3 \times 10^7 \times 97 \times (3{,}000)^3)^{-1/4} = 0.113 \text{ inches}$$

The resultant deflection and stresses should not cause a problem for the maglev guideway even when a heavy train passes, provided compliant layers are used.

Figure 11:
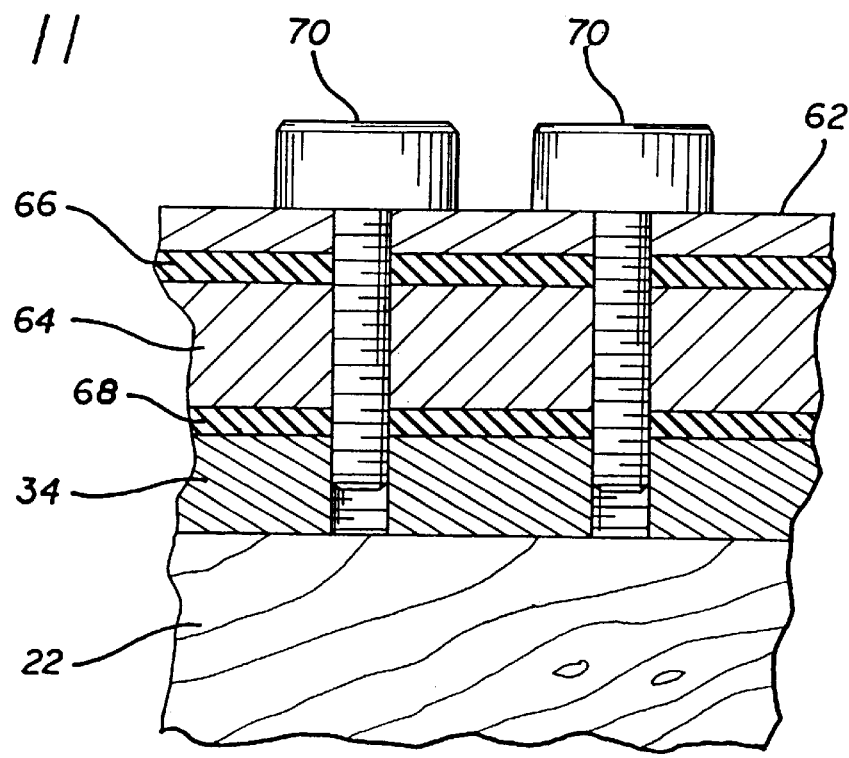
FIG. 11 is an enlarged cross-sectional elevational view of a small section of a guideway panel mounted to a support bar on a railroad tie according to the principles o the invention.
Figure 12:
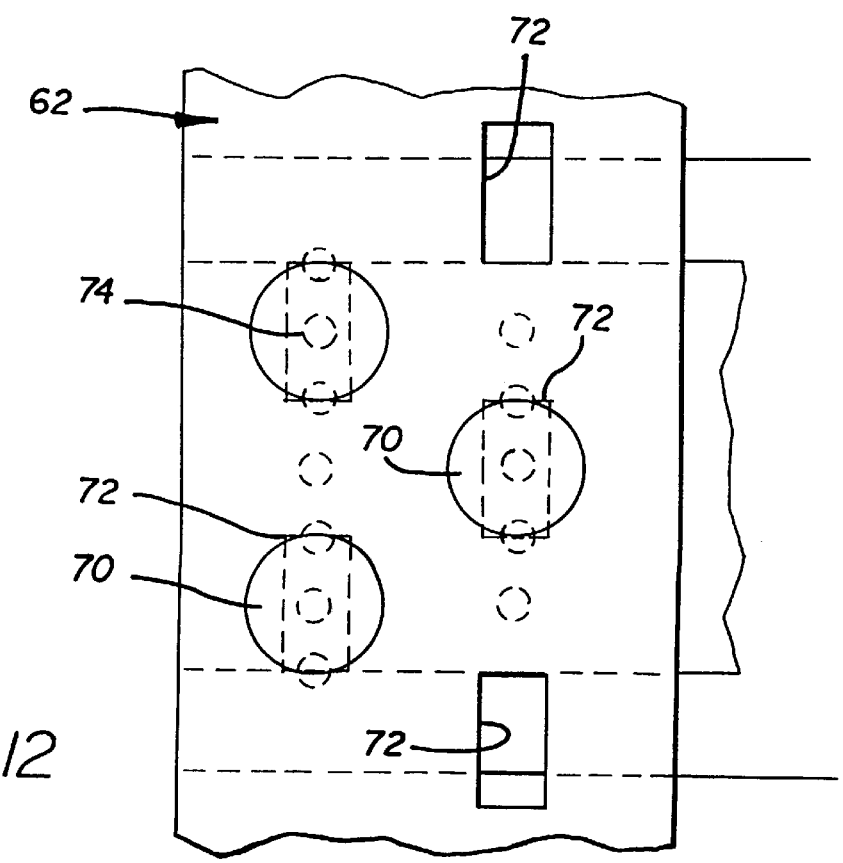
FIG. 12 is an enlarged top plan view a small section of a guideway panel mounted to a support bar as in FIG. 11.

With reference to FIGS. 7–14, in a presently preferred embodiment, the guideway panels 62 are mounted on the support bars, with one or more shims 64 with upper and lower compliant layers 66, 68 mounted between guideway panel and support bar. The guideway panels are preferably light weight flat plastic plates mounted by threaded fasteners 70, such as screws or bolts, for example, as is illustrated in FIGS. 11 and 12. In a presently preferred embodiment, the guideway panels can be attached to the support bars by bolt fasteners, with the bolts being screwed into pre-drilled holes in the support bars.

The length of each panel is the same, and is chosen so that the panel has an integral number of quad lengths. As is illustrated in FIG. 7, for example, the panel is three quad lengths long, or approximately 11½ feet, although panels can be longer or shorter if desired. Larger panels become excessively heavy and difficult to handle, while much shorter ones increase the cost of installation. The overall thickness of the guideway panel including windings, is approximately three inches, although most of the enclosed volume is empty. In one presently preferred embodiment, the guideway panels are formed from plastic, such as polyester-fiberglass or polyethylene polyester-fiberglass, for example, and has grooved raised strips at appropriate locations that hold the wound coils at the correct height.

In general, the railroad tie spacing will not be an integral sub-multiple of the quad length. As a result, the positions of the support bars will shift relative to the guideway panels along the railroad track, and the fasteners to the support bars must be located at different longitudinal positions on the guideway panel along the track. This is accomplished by using multiple rows of slots 72 formed in each guideway panel for receiving the fasteners, typically arranged in rows of double slots. The inner row is close to the inner edge of the guideway panel, adjacent to the railroad tie, while the outer row is close to the outer end of the support bar. In one presently preferred embodiment, the slots are provided in two rows of spaced apart alternating slots, allowing for different matching configurations with the underlying holes 74 in the support bars for receiving the fasteners, as shown in FIGS. 13A–13H. Thus in FIG. 13A, three support bar holes 74 are exposed; in FIG. 13B, five support bar holes 74 are exposed; in FIG. 13C, two support bar holes 74 are exposed; in FIG. 13D, five support bar holes 74 are exposed; in FIG. 13E, three support bar holes 74 are exposed; in FIG. 13F, five support bar holes 74 are exposed; in FIG. 13G, two support bar holes 74 are exposed; and in FIG. 13H, five support bar holes 74 are exposed. Other configurations of one or more rows of slots may also be suitable. FIG. 12 shows one of the two double slot rows; the other would be identical in geometry. The slots are arranged so that for any longitudinal position of the panel relative to the support bars, at least two holes in the support bar are exposed in a row of double slots. For the configurations shown in FIGS. 13A–13H, for example, the number of exposed holes varies from a minimum of two to a maximum of five over the complete range of longitudinal positions of the guideway panel relative to a support bar. Alternatively, the slots can be arranged to provide that a minimum of three holes are always exposed over a complete range of longitudinal positions of the panel relative to a support bar. The slots are typically 1 inch wide, to accommodate small variations in the lateral position of the guideway panel relative to the line of holes in the support bars. The two inch diameter heads on the screw in bolts extend beyond the lip of the slots, providing a firm engagement of the panel to the support bars when tightened. Compliant washers are also used under the bolts that hold the panels to the support bars.

Referring to FIG. 10, two lines of the light weight, flat plastic guideway panels are installed along an existing railroad track, with the two lines of guideway sheets attached to the portions of the railroad ties lying outside the iron rails and tie plates. For most trackage, a tie length of 8 feet, 6 inches is used. This corresponds to a tie length outside of the rail and its associated tie plate of approximately 14 inches; the guideway sheet would extend beyond the end of the tie. The length of the assembled registration grid/support bar units does not need to be the same as that for the guideway panels.

As is shown in FIGS. 7–9, each of the guideway panels is provided with attached lift and stability loops 76, for providing vertical lift, pitch and roll stability to the vehicle, and linear synchronous motor (LSM) means 78, such as LSM windings, for providing linear propulsion to the vehicle. Each of the guideway panels also preferably has lateral stability means 80 for providing lateral stabilization and centering of the vehicle with respect to the guideway, such as FIG. 8 lateral stability loops, for example.

Referring to FIGS. 7–9, the vertical and stability lops are located on the lower level of the guideway sheet, with the FIG. 8 lateral stability loops and the LSM windings on the upper level. The guideway conductor windings (loops as well as LSM windings) can, for example, be a one inch thick, two inch wide pack of wound aluminum wire, although other similar dimensions may also be suitable. The conductor pack may also have passages for natural convective flow of air coolant to dissipate heat.

The FIG. 8 conductor windings at the ends of the lateral stability loops curve downwards to pass under the LSM windings. In a currently preferred embodiment, the vertical lift/stability and lateral stability loops are pre-installed on the guideway panels in quads, or groupings of the lateral stability loops with each vertical lift/stability loop, during manufacture of the panels, and are firmly fastened to it with appropriate straps, tie down blocks or other similar fasteners. In a currently preferred embodiment, each vertical lift/stability loop is centered on the cross-overs of the LSM winding. This prevents the LSM winding from causing a net flux and induced current through the vertical lift/stability loop. The dimensions of the loops are illustrative and are not rigidly specified. Their length and dimensions can change, and it may be desirable to make the quad width somewhat smaller, to help reduce the lateral extent of the guideway, and to reduce the magnitude of the fringing field.

The lateral stability loops installed on the guideway panels stabilize the vehicle even in the presence of strong cross winds. The lateral stability figure eight loops of the guideway panels provide a magnetically restoring force that always tends to push the vehicle to the center line of the guideway. If a cross wind blows or the vehicle is on a curved section of the guideway, the restoring magnetic force will counter the wind or centrifugal force, or combination thereof. For example, if a 1g external force were to act on the vehicle, it would displace the center line of the vehicle approximately one inch from the center line of the guideway; if the external force were 2g, it would displace the center line of the vehicle approximately two inches from the center line of the guideway. The system is thus strongly stable, with the restoring force being about 1g (i.e., a 1g force is equal to the weight of the vehicle) per inch of displacement from the center line of the guideway. Any conceivable external force will be much less than what is necessary to displace the vehicle to an unsafe extent.

At all times the levitated vehicle is magnetically held at a stable equilibrium position above the guideway and constrained to follow the line of the guideway, irrespective of whatever external forces (i.e., wind or curves) act upon it. No outer or inner envelope is need or required for safe operation.

Important parameters of the maglev track/guideway emplacement on rail lines are 1) the center to center distance between double track; 2) the maximum cross sectional dimensions of freight and passenger cars; 3) the maximum wheel loads on rails; and 4) the degree of curvature of track. The center to center distance between tracks on main line routes is generally 14 feet or greater; and for high speed rail lines, 15½ feet has been used. The maximum allowable width for freight cars is 10 feet 8 inches, and the maximum allowable height above the rail is 15 feet 1 inch. These values are for unrestricted interchange between different rail systems. For special routes and cases, these values can be exceeded. Passenger cars are generally as wide as freight cars, but their height is somewhat less, except for bi-level cars. Rapid transit cars are about as wide, but their height is also less. In general, the width constraint will be more important than the height constraint for the maglev track/guideway emplacement on rail lines system. Typically, locomotives have the heaviest wheel loads, having a maximum wheel load of about 35,000 pounds. Freight cars typically have a maximum wheel load of about 25,000 pounds, and passenger cars typically have a maximum wheel load of about 15,000 pounds. Generally freight and passenger cars have 8 wheels per car.

The average pressure on the bottom face of a tie when a wheel (actually two wheels, with one on each rail) is overhead is given by the expression:

$$p = \frac{2p}{bl} \text{ psi}$$

where p=the wheel load in pounds, b=width of the tie in inches, and l=the length of the tie in inches.

For the case where p=30,000 pounds, such as for a heavy freight car, and a standard tie, having a length of 102 inches and a width of 9 inches, the pressure on the bottom face of the tie is 63 psi. Local pressures can be up to 2 times the average pressure on the bottom face of the tie. The maglev track/guideway emplacement on rail lines system results in much lower pressures on the ties and the ballast than is typically encountered with conventional trains. For example, for a thousand pound per foot loading, the average bottom face pressure on ties is only 1.7 psi, or 3% of that experienced during normal operation of a freight train, which has important implications for extension of track lifetime. The maglev track/guideway emplacement on rail lines system also results in much lower stresses on the rails, so that continued passage of conventional railroad trains over the dual railroad maglev track/guideway does not damage, degrade or alter the position of the maglev guideway emplacement.

Referring to FIG. 10, a conventional railroad track typically has ties approximately 8 feet 6 inches long, 9 inches wide, and 7 inches deep, with the ties commonly being spaced 19½ inches center to center. The track to track spacing is typically 14 feet center to center on the main line track, and for a maglev track/guideway emplacement on rail lines system typically adapted for maglev vehicles using quadrupole superconducting magnets, the horizontal spacing of the railroad rail from the nearest superconductor element is currently preferably at least 20 inches, and this spacing constraint is adopted to minimize eddy current effects, such as heating and mechanical forces in the steel rail.

After the guideway panels have been installed on the railroad track, the LSM conductor windings are laid into their grooved raised strips. The LSM conductors are attached to a flexible sheet that is wound on a reel. The reel holds several hundred feet of continuous LSM winding, which is laid down on the succession of installed panels. The laid-down sections are then subsequently connected to form a continuous winding between the block length electrical switches. In a presently preferred embodiment, the optimum switched LSM block length is in the range of several hundred to several thousand feet.

As is illustrated in FIG. 15, after the LSM winding is laid down into the guideway panel, the protective cover sheet 82 is installed on the panel to keep out dirt, rain, and the like. The cover sheet is currently preferably relatively thin, such as about $\frac{1}{8}$ to $\frac{1}{4}$ inch thick, for example, and can be made of polyethylene or polyester-fiberglass, although similar materials may also be suitable.

Referring to FIG. 16, the railroad trackage can be surveyed before installation of the guideway, using automated sensing techniques to determine the relevant parameters, including tie spacing, width and length, flatness of the road bed, curvature, variations in elevation, and the like. The support bars would then be appropriately spaced on the registration grid stringers and fastened to them. In order to optimize efficiency of installation and to avoid interference with regular railroad operations, it is important that the prefabricated guideway panels and pre-assembled support bar/registration grid units be distributed along the railroad track prior to their installation, so that track installation crews can take them up and install them when there is a suitable free period between scheduled trains. Installation of the power lines, frequency synthesizers and LSM switches would be carried out in parallel with the guideway panel installations. The system would then be ready for checkout and operation after the LSM windings were connected to the frequency synthesizers.

In one currently preferred embodiment illustrated in FIG. 16, the guideway panels can be aligned using a laser alignment method. Shims of an appropriate thickness can be placed on top of the support bars, so that their upper surfaces are at the correct elevation, as determined by a small reflector 84 on top of the shim for alignment of the support bars with a laser beam 86 from a laser spot illuminator 88. The reflector can fold down when the guideway panel is laid on the shims. As shown in FIG. 14, a combination of two shims can be used, allowing the installers to control the surface elevation to within $\pm\frac{1}{8}$ inch, or $\pm\frac{1}{16}$ inch, as desired. The elevation measurements should take into account the thinning of the compliant layers when the panel fasteners are tightened. As is illustrated in FIGS. 17 and 18, the laser alignment method accommodates gentle vertical and horizontal curves by making a series of straight line segment approximations along the track; changes in tilt of the track can be accommodated by appropriate adjustments in the shim thickness on each side of the track.

Figure 19:
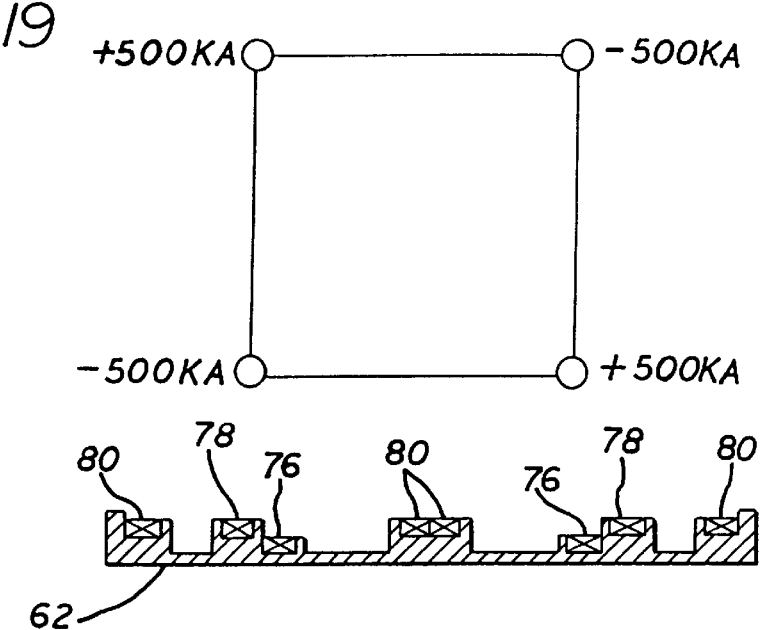
FIG. 19 is schematic cross-sectional view of an exemplary superconducting quadrupole magnet of a maglev vehicle in relationship to one of the guideway panels of the guideway system according to the invention.
Figure 20:
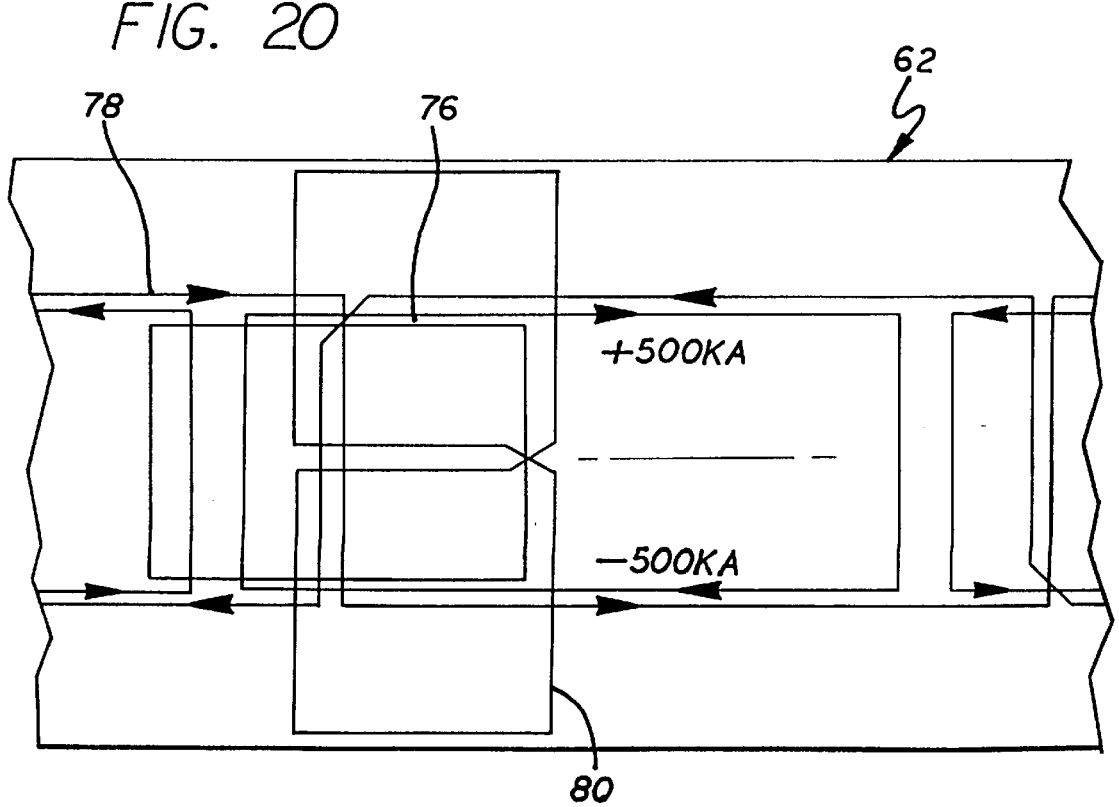
FIG. 20 is a schematic top view of the superconducting quadrupole magnet and a portion of the guideway panel of FIG. 19.

As is illustrated in FIGS. 19 and 20, the maglev track/guideway emplacement on rail lines system is typically adapted for maglev vehicles using quadrupole superconducting magnets, with the nominal dimensions of an 18 inch square quadrupole, a 38 inch wide guideway panel, and a 6 inch clearance (including the conductor and cryogenic envelope dimensions). A number of alternate superconducting magnet/guideway loop configurations are also possible. One presently preferred alternative embodiment utilizes a "squashed" quadrupole, in which the distance between the upper and lower superconductor loops is smaller than their width, such as a 12 inch distance between the upper and lower superconductor loops instead of 18 inches, which would not seriously affect the lift and stability forces, but would greatly reduce the fringing field. The ability to ride on the sides of a narrow beam guideway would be impaired; however, it may prove feasible to use only the bottom of the quadrupole winding type guideway, even when the guideway is elevated. In another presently preferred alternative embodiment, the linear dimensions of the quadrupole and the width of the guideway panel are reduced, such as a 12 inch quadrupole above a 30 inch wide guideway. This configuration will probably require a slightly larger superconducting current than the 18 inch quadrupole.

Another presently preferred alternative embodiment utilizes null flux guideway loop configuration like those described in U.S. Pat. No. (5,503,083), which is incorporated herein by reference in its entirety, although a simple dipole loop with external inductance could also be used.

In another presently preferred alternative embodiment, narrower lateral stability loops can be used. Simple dipole loops can be centered on the superconductors for lateral stability, although they would be slightly off-center to compensate for the flux from the other three superconductor winding on the quadrupole. A narrow FIG. 8 loop that does not extend substantially beyond the sides of the quadrupole could also be used, and this would increase the required superconductor current somewhat.

If necessary, the preferred width of the guideway panel could be reduced from approximately 38 inches to as little as about 20 inches. The fringing field can also be reduced, if the fringing field magnitude of the normal design is too high.

In another presently preferred alternative embodiment, non-quadrupole superconducting magnets can also be used. A FIG. 8 dipole superconducting magnet, for example, will have a lower fringe field than a quadrupole magnet of the same width. The guideway loop configuration changes somewhat, with the FIG. 8 guideway loop now becoming the vertical lift/stability loop (instead of the lateral stability loop, which was the case for the quadrupole vehicle magnet), and the simple dipole guideway loop now becoming the lateral stability loop, instead of the vertical lift/stability loop. The LSM winding pattern also changes, becoming a two loop winding in a reverse, side-by-side pattern instead of a one loop pattern.

It will thus be appreciated that the invention provides for a maglev guideway emplacement on existing rail lines that can be installed relatively quickly, and at relatively low expense, and can be used by both maglev vehicles and conventional trains, to improve transportation capacity and reduce headways between trains.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. An electromagnetic induction suspension and stabilization guideway for a vehicle having a plurality of superconducting magnets to provide electromagnetic suspension of the vehicle, said electromagnetic induction suspension and stabilization guideway being adapted for emplacement on railroad ties of an existing rail line for trains, said electromagnetic induction suspension and stabilization guideway comprising:

a plurality of railroad ties of a railroad line, said railroad ties having inside and outside portions;

a plurality of guideway panels, each of said guideway panels being mounted on outside portions of said railroad ties; and vertical lift and stability means mounted on said plurality of guideway panels for providing vertical lift, pitch and roll stability to a vehicle, whereby said vehicle can travel either on said guideway emplaced on an existing rail line or on a separate dedicated guideway.

2. The electromagnetic induction suspension and stabilization guideway of claim 1, wherein said plurality of guideway panels are mounted to said railroad ties by a plurality of support bars.

3. The electromagnetic induction suspension and stabilization guideway of claim 1, further comprising lateral stability means mounted on said guideway panel for providing lateral stabilization and centering of the vehicle with respect to said guideway.

4. The electromagnetic induction suspension and stabilization guideway of claim 1, further comprising linear synchronous motor means mounted on said guideway panel for providing linear propulsion to the vehicle.

5. The electromagnetic induction suspension and stabilization guideway of claim 1, further comprising a protective cover sheet mounted to said guideway panel.

6. The electromagnetic induction suspension and stabilization guideway of claim 2, further comprising a compliant layer of elastomeric material disposed between each of said support bars and their respective supporting railroad ties.

7. The electromagnetic induction suspension and stabilization guideway of claim 6, wherein said compliant layer of material comprises a rubber layer.

8. The electromagnetic induction suspension and stabilization guideway of claim 2, further comprising a plurality of fasteners mounting each of said support bars to their respective supporting railroad tie, and wherein each of said support bars has a surface defining a plurality of holes for receiving said fasteners.

9. The electromagnetic induction suspension and stabilization guideway of claim 2, further comprising a registration grid, said plurality of support bars being mounted onto said registration grid to keep said plurality of support bars properly positioned relative to each other and to said supporting railroad ties.

10. The electromagnetic induction suspension and stabilization guideway of claim 9, wherein said registration grid comprises a plurality of registration grid stringers.

11. The electromagnetic induction suspension and stabilization guideway of claim 10, wherein said support bars are mounted to said registration grid stringers by fasteners, and each of said registration grid stringers has a surface defining a plurality of apertures for receiving said fasteners.

12. The electromagnetic induction suspension and stabilization guideway of claim 2, further including a shim made of elastomeric material mounted between at least one of said support bars and the corresponding guideway panel.

13. The electromagnetic induction suspension and stabilization guideway of claim 2, wherein said guideway panels are mounted to said support bars by fastener means.

14. The electromagnetic induction suspension and stabilization guideway of claim 13, wherein said fastener means comprises a threaded fastener.

15. The electromagnetic induction suspension and stabilization guideway of claim 13, wherein each said guideway panel has a surface defining a plurality of slots in said guideway panel for receiving said fastener means.

16. The electromagnetic induction suspension and stabilization guideway of claim 13, wherein each said guideway panel has a surface defining a plurality of rows of slots in said guideway panel for receiving said fastener means.

17. The electromagnetic induction suspension and stabilization guideway of claim 13, wherein each said guideway panel has a surface defining two rows of spaced apart alternating slots in said guideway panel for receiving said fastener means.

18. The electromagnetic induction suspension and stabilization guideway of claim 5, wherein said protective cover sheet is made of polyethylene.

19. The electromagnetic induction suspension and stabilization guideway of claim 5, wherein said protective cover sheet is made of polyester-fiberglass.

20. An electromagnetic induction suspension and stabilization guideway for emplacement on railroad ties of an existing rail line for a vehicle having a plurality of superconducting magnets, said guideway comprising:

a plurality of railroad ties of a railroad line, said railroad ties having inside and outside portions;

a plurality of guideway panels, each of said guideway panels being mounted on outside portions of said railroad ties;

vertical lift and stability means mounted on said plurality of guideway panel for providing vertical lift, pitch and roll stability to the vehicle;

lateral stability means mounted on said guideway panel for providing lateral stabilization and centering of the vehicle with respect to said guideway; and linear synchronous motor means mounted on said guideway panel for providing linear propulsion to the vehicle.

21. The electromagnetic induction suspension and stabilization guideway of claim 20, wherein said plurality of guideway panels are mounted to said railroad ties by a plurality of support bars.

22. The electromagnetic induction suspension and stabilization guideway of claim 20, further comprising a protective cover sheet mounted to said guideway panel.

23. The electromagnetic induction suspension and stabilization guideway of claim 21, further comprising a compliant layer of elastomeric material disposed between each of said support bars and their respective supporting railroad ties.

24. The electromagnetic induction suspension and stabilization guideway of claim 23, wherein said compliant layer of material comprises a rubber layer.

25. The electromagnetic induction suspension and stabilization guideway of claim 21, further comprising a plurality of fasteners mounting each of said support bars to their respective supporting railroad tie, and wherein each of said support bars has a surface defining a plurality of holes for receiving said fasteners.

26. The electromagnetic induction suspension and stabilization guideway of claim 21, further comprising a registration grid, said plurality of support bars being mounted onto said registration grid to keep said plurality of support bars properly positioned relative to each other and to said supporting railroad ties.

27. The electromagnetic induction suspension and stabilization guideway of claim 26, wherein said registration grid comprises a plurality of registration grid stringers.

28. The electromagnetic induction suspension and stabilization guideway of claim 27, wherein said support bars are mounted to said registration grid stringers by fasteners, and each of said registration grid stringers has a surface defining a plurality of apertures for receiving said fasteners.

29. The electromagnetic induction suspension and stabilization guideway of claim 21, further including a shim made of elastomeric material mounted between at least one of said support bars and the corresponding guideway panel.

30. The electromagnetic induction suspension and stabilization guideway of claim 21, wherein said guideway panels are mounted to said support bars by fastener means.

31. The electromagnetic induction suspension and stabilization guideway of claim 30, wherein said fastener means comprises a threaded fastener.

32. The electromagnetic induction suspension and stabilization guideway of claim 30, wherein each said guideway panel has a surface defining a plurality of slots in said guideway panel for receiving said fastener means.

33. The electromagnetic induction suspension and stabilization guideway of claim 30, wherein each said guideway panel has a surface defining a plurality of rows of slots in said guideway panel for receiving said fastener means.

34. The electromagnetic induction suspension and stabilization guideway of claim 30, wherein each said guideway panel has a surface defining two rows of spaced apart alternating slots in said guideway panel for receiving said fastener means.

35. The electromagnetic induction suspension and stabilization guideway of claim 22, wherein said protective cover sheet is made of polyethylene.

36. The electromagnetic induction suspension and stabilization guideway of claim 22, wherein said protective cover sheet is made of fiberglass reinforced polyester.

* * * * *

UNITED STATES PATENT AND TRADEMARK OFFICE
CERTIFICATE OF CORRECTION

PATENT NO. : 6,085,663
DATED : Jul. 11, 2000
INVENTOR(S) : James R. Powell, Gordon T. Danby It is certified that error appears in the above-identified patent and that said Letters Patent is hereby corrected as shown below:

Column 1, lines 48 & 49, change "FIG.8", to
    read --figure 8--.

Column 5, line 20, change "FIG. 8", to read
    --figure 8--.

Column 9, line 35, change "FIG. 8", to read
    --figure 8--.

Column 12, lines 30, 41 & 45 change "FIG. 8", to read
    --figure 8--.

Signed and Sealed this

Tenth Day of April, 2001

*Attest:*

NICHOLAS P. GODICI

*Attesting Officer*     *Acting Director of the United States Patent and Trademark Office*